US009398355B2

(12) United States Patent
Tracy

(10) Patent No.: US 9,398,355 B2
(45) Date of Patent: *Jul. 19, 2016

(54) RECTANGULAR WALL MOUNTED SPEAKER ASSEMBLY WITH FOUR CORNER WALLS AND CORNER MOUNTING BRACKET

(71) Applicant: Dennis A. Tracy, Culver City, CA (US)

(72) Inventor: Dennis A. Tracy, Culver City, CA (US)

(*) Notice: Subject to any disclaimer, the term of this patent is extended or adjusted under 35 U.S.C. 154(b) by 345 days.

This patent is subject to a terminal disclaimer.

(21) Appl. No.: 14/033,792

(22) Filed: Sep. 23, 2013

(65) Prior Publication Data

US 2014/0037125 A1    Feb. 6, 2014

Related U.S. Application Data

(63) Continuation of application No. 13/106,308, filed on May 12, 2011, now Pat. No. 8,577,073.

(60) Provisional application No. 61/333,914, filed on May 12, 2010.

(51) Int. Cl.
*H04R 1/02* (2006.01)
*B60R 11/02* (2006.01)
*H04R 1/28* (2006.01)
*H04R 9/02* (2006.01)

(52) U.S. Cl.
CPC ............. *H04R 1/02* (2013.01); *B60R 11/0217* (2013.01); *H04R 1/288* (2013.01); *H04R 1/025* (2013.01); *H04R 1/2842* (2013.01); *H04R 9/022* (2013.01); *H04R 2201/021* (2013.01); *H04R 2499/13* (2013.01)

(58) Field of Classification Search
CPC .......... H04R 1/02; H04R 1/021; H04R 1/023; H04R 1/025; H04R 1/026; H04R 1/028; H04R 9/022; H04R 2201/021
USPC .......... 381/345–354, 386–395; 181/148–156, 181/189, 198–199
See application file for complete search history.

(56) References Cited

U.S. PATENT DOCUMENTS

| 2,757,751 | A |   | 8/1956 | Tavares |
| 3,636,281 | A | * | 1/1972 | Cozart ........................ 381/332 |
| 3,688,864 | A |   | 9/1972 | Guss |
| 4,230,905 | A |   | 10/1980 | Crum et al. |
| 4,509,184 | A |   | 4/1985 | Yanagawa |
| 4,549,631 | A |   | 10/1985 | Bose |
| 4,572,326 | A |   | 2/1986 | Hutchins |
| 4,875,546 | A |   | 10/1989 | Krnan |
| 4,984,268 | A | * | 1/1991 | Brown et al. ............ 379/433.02 |
| 5,025,885 | A |   | 6/1991 | Froeschle |
| 5,092,424 | A |   | 3/1992 | Schreiber et al. |

(Continued)

*Primary Examiner* — Ahmad F Matar
*Assistant Examiner* — Katherine Faley
(74) *Attorney, Agent, or Firm* — Welsh Flaxman & Gitler LLC

(57) ABSTRACT

A loudspeaker module includes a housing having a plurality of side walls and a cover plate positioned over a top surface of the plurality of side walls, a bottom of the housing remaining open. A driver mounting plate is secured to the plurality of side walls and divides the housing into an upper compartment and a lower compartment. At least one of the plurality of side walls includes an aperture linking the lower compartment to the external environment surrounding the housing. A driver is mounted to the driver mounting plate, the driver being positioned to fire into the lower compartment of the housing. A mounting bracket is secured to the at least one of the plurality of side walls including an aperture.

17 Claims, 9 Drawing Sheets

(56) References Cited

U.S. PATENT DOCUMENTS

| | | | |
|---|---|---|---|
| 5,143,339 A * | 9/1992 | Ashcraft et al. | 248/343 |
| 5,210,793 A | 5/1993 | Carlson et al. | |
| 5,731,553 A | 3/1998 | Ledoux | |
| 6,215,884 B1 | 4/2001 | Parrella et al. | |
| 6,430,297 B1 * | 8/2002 | Nakamura | H04R 1/021 |
| | | | 181/148 |
| 6,493,455 B1 * | 12/2002 | Tracy | 381/345 |
| 6,587,567 B1 | 7/2003 | Yamamoto | |
| 8,577,073 B2 * | 11/2013 | Tracy | 381/395 |
| 2004/0076304 A1 | 4/2004 | Freeman et al. | |
| 2004/0218777 A1 | 11/2004 | Hagman | |
| 2007/0116304 A1 | 5/2007 | Hall et al. | |
| 2008/0137902 A1 | 6/2008 | Bohlender et al. | |
| 2010/0254557 A1 * | 10/2010 | Cho et al. | 381/345 |

\* cited by examiner

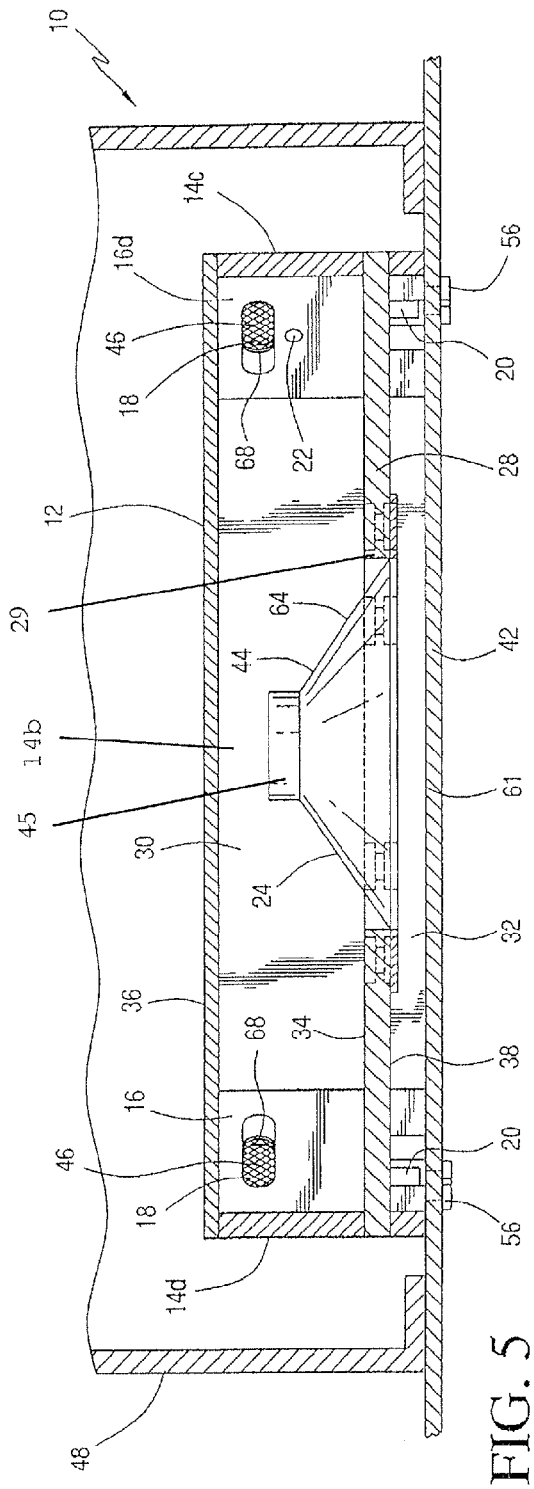

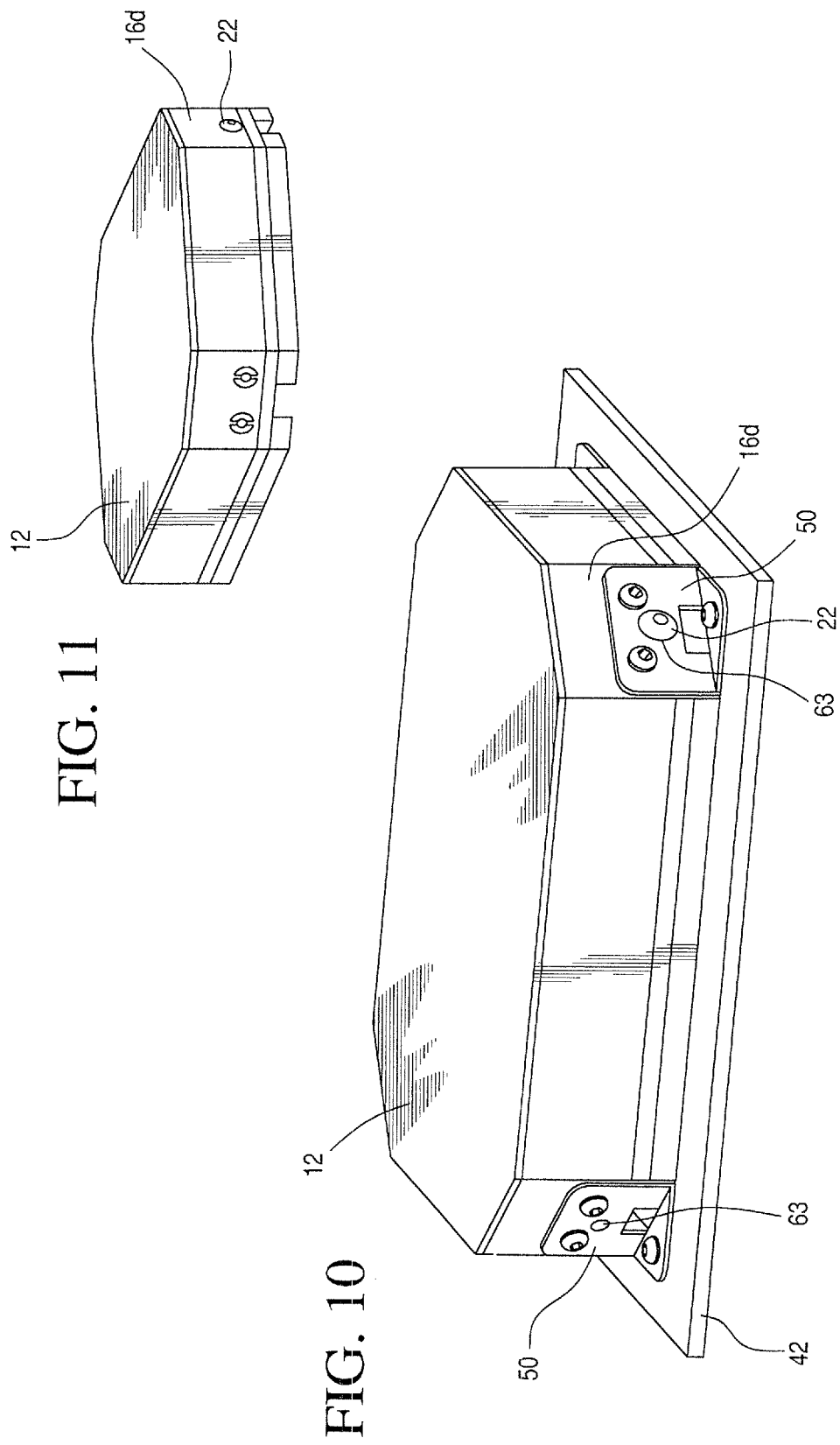

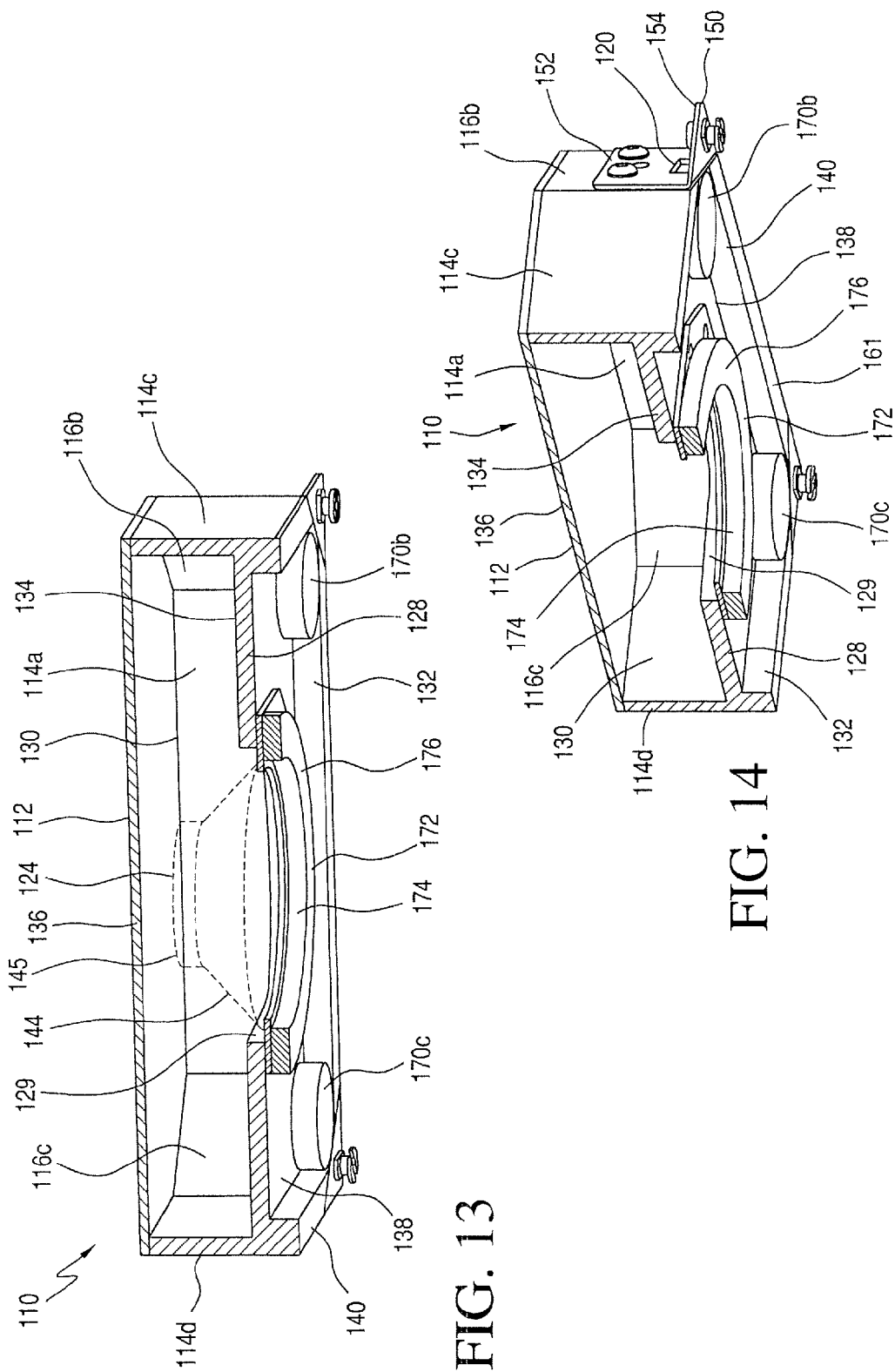

RECTANGULAR WALL MOUNTED SPEAKER ASSEMBLY WITH FOUR CORNER WALLS AND CORNER MOUNTING BRACKET

CROSS REFERENCE TO RELATED APPLICATION

This application is a continuation of U.S. patent application Ser. No. 13/106,308, entitled "RECTANGULAR WALL MOUNTED SPEAKER ASSEMBLY," filed May 12, 2011, which claims the benefit of U.S. Provisional Patent Application Ser. No. 61/333,914, entitled "LOUDPSEAKER SYSTEM", filed May 12, 2010.

BACKGROUND OF THE INVENTION

1. Field of the Invention

The present invention relates to a loudspeaker system. More particularly, the invention relates to a low frequency loudspeaker, that is, a subwoofer module.

2. Description of the Related Art

The current global community has made it possible for people all around the country, and around the world, to interact for both business and personal reasons. For many people, this requires they spend considerable time traveling from one location to another location. More often than not, these people travel in aircraft. Whether these people travel in private or commercial aircraft, they desire high quality entertainment during the many hours they spend within the confines of an aircraft. However, while high quality entertainment, for example, digital video with CD quality sound, is readily available for theater and home use, the weight and size requirements for use in aircraft make it very difficult to incorporate high fidelity systems within an aircraft. This problem is especially pronounced for audio loudspeaker assemblies when one attempts to meet the size, weight and shape requirements for use in aircrafts.

In the aircraft industry, great priority is placed upon component weight and size reduction. In addition, spacing and positioning of the loudspeaker assemblies are a great priority to those optimizing the operation of aircraft. The size, weight and shape of conventional terrestrial loudspeaker assembly designs adversely affect range and payload. These concerns are notable when one attempts to make changes within smaller, private jets. For example, a small increase in the weight carried by an aircraft results in a substantial increase in fuel consumption of the aircraft. In addition, the limited space available within an aircraft dictates the use of any space within the aircraft be carefully considered by those responsible for ensuring the comfort of passengers.

Lightweight and compact audio loudspeakers are currently available. These loudspeakers, however, substantially compromise sound quality for reductions in size and weight. An individual wishing to add an audio system to an aircraft must make a choice between high fidelity loudspeakers not suiting the size and weight requirements of the aircraft and lower quality loudspeakers providing desirable size and weight characteristics.

A need, therefore, exists for loudspeaker assemblies providing high fidelity sound, while meeting the size and weight requirements of an aircraft. The present invention provides such a loudspeaker assembly.

SUMMARY OF THE INVENTION

It is, therefore, an object of the present invention to provide a loudspeaker module including a housing having a plurality of side walls and a cover plate positioned over a top surface of the plurality of side walls, a bottom of the housing remaining open. A driver mounting plate is secured to the plurality of side walls and divides the housing into an upper compartment and a lower compartment, wherein the upper compartment is defined by an upper surface of the driver mounting plate, the plurality of side walls and the cover plate, and the lower compartment is defined by a lower surface of the driver mounting plate and the plurality of side walls. The bottom of the housing remains open to be ultimately closed off when the loudspeaker module is mounted to a supporting surface. At least one of the plurality of side walls includes an aperture linking the lower compartment to the external environment surrounding the housing. A driver is mounted to the driver mounting plate, the driver being positioned to fire into the lower compartment of the housing. A mounting bracket is secured to the at least one of the plurality of side walls including an aperture. The mounting bracket includes a mounting bracket aperture shaped and dimensioned for alignment with the aperture within the at least one of the plurality of side walls.

It is also an object of the present invention to provide a loudspeaker module wherein the driver is a low frequency driver.

It is another object of the present invention to provide a loudspeaker module wherein the housing is made of aluminum honeycomb sheet material that resonates in a manner transmitting sound from an interior of the housing.

It is a further object of the present invention to provide a loudspeaker module wherein the housing includes four lateral side walls and four corner side walls, the four corner side walls being positioned between, and connected to, respective lateral side walls.

It is also an object of the present invention to provide a loudspeaker module wherein each of the four corner side walls includes the aperture.

It is another object of the present invention to provide a loudspeaker module including a plurality of identical mounting brackets shapes and dimensioned for selective attachment to each of the four corner side walls, each of the mounting brackets including a first leg and a second leg. The first leg is shaped and dimensioned for direct attachment to a corner side wall and the second leg is shaped and dimensioned for attachment to a support surface, the first leg being constructed with the mounting bracket aperture shaped and dimensioned for alignment with the aperture in a corner sidewall.

It is a further object of the present invention to provide a loudspeaker module wherein each of the four corner side walls includes a first aperture and a second aperture, and the first aperture is positioned above the second aperture.

It is also an object of the present invention to provide a loudspeaker module wherein the first leg includes respective first and second mounting bracket apertures shaped and dimensioned for alignment with the first apertures and second apertures.

It is another object of the present invention to provide a loudspeaker module wherein a convex portion of the driver extends into the upper compartment of the housing, such that the first apertures allow for the flow of air into and out of the upper compartment for cooling the driver.

It is a further object of the present invention to provide a loudspeaker module wherein a permeable filtering material is secured over the first apertures.

It is also an object of the present invention to provide a loudspeaker module wherein the four corner side walls are oriented at a 45 degree angle relative to the respective lateral side walls.

It is another object of the present invention to provide a loudspeaker module wherein the four lateral side walls include two long lateral side walls and two short lateral side walls, and the four corner side walls are positioned between, and connected to, a respective long lateral side wall and a short lateral side wall.

It is a further object of the present invention to provide a loudspeaker module wherein each of the four corner side walls includes the aperture.

It is also an object of the present invention to provide a loudspeaker module wherein a convex portion of the driver extends into the upper compartment of the housing, such that the first apertures allow for the flow of air into and out of the upper compartment for cooling the driver It is another object of the present invention to provide a loudspeaker module wherein a permeable filtering material is secured over the first apertures.

It is a further object of the present invention to provide a loudspeaker module including an acoustic member positioned within the lower compartment adjacent the aperture in the at least one of the plurality of side walls.

It is also an object of the present invention to provide a loudspeaker module wherein the acoustic member is foam.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 5 and 6 are respectively cross sectional views along the line 5-5 in FIGS. 1 and 6-6 in FIG. 2 (with the surrounding structure, that is, the supporting surface and aircraft seat, shown).

FIGS. 10 and 11 are respectively a side perspective view with the mounting brackets and a side perspective view without the mounting brackets in accordance with yet another embodiment of the present invention.

FIGS. 13 and 14 are side cross sectional views of the subwoofer module shown in FIG. 12 (with the driver shown in phantom lines in FIG. 13).

DESCRIPTION OF THE PREFERRED EMBODIMENTS

Figure 1:
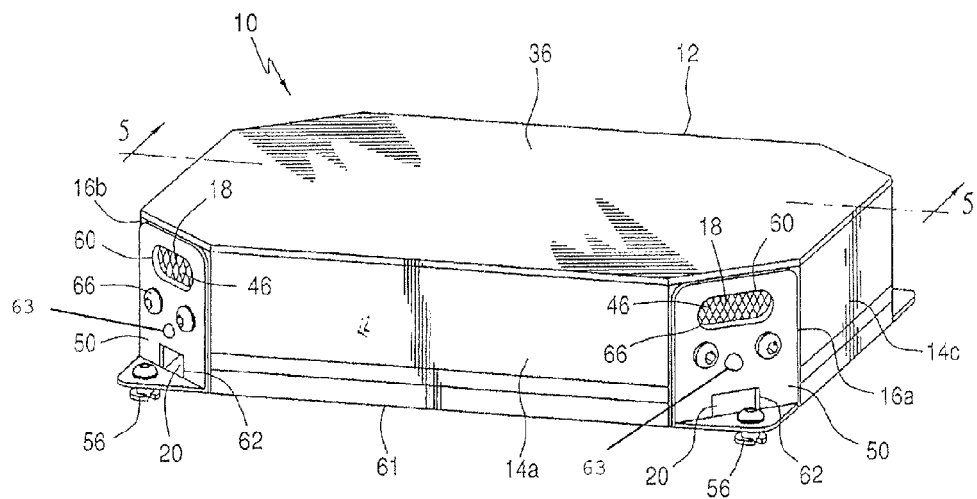
FIG. 1 is a side perspective view of the present subwoofer module.
Figure 2:
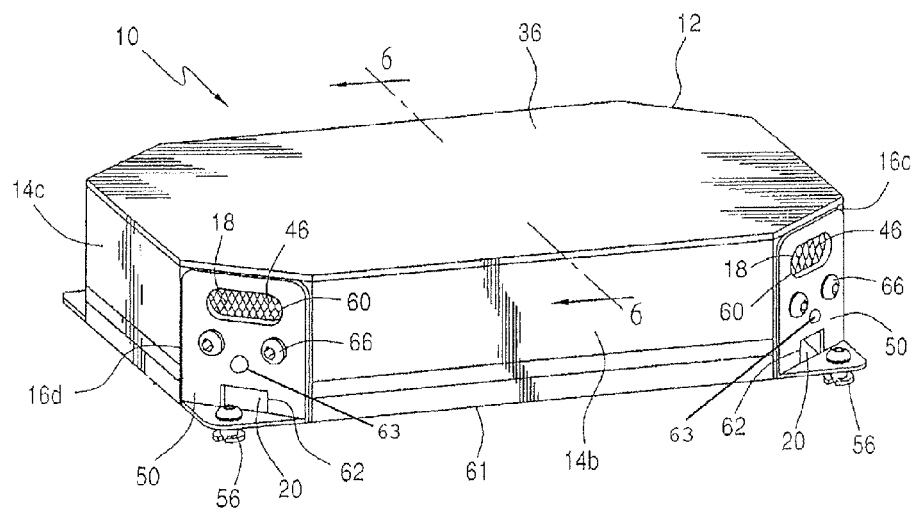
FIG. 2 is a top perspective view of the subwoofer module shown in FIG. 1.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 6, a loudspeaker system in the form of a subwoofer module 10 is disclosed. The subwoofer module 10 is particularly designed for use within an aircraft, although the subwoofer module 10 may be used in various other environments without departing from the spirit of the present invention. The present subwoofer module 10 is particularly designed for horizontal positioning on the floor of an aircraft.

The subwoofer module 10 includes a substantially rectangular housing 12. The housing 12 is preferably manufactured from aluminum. More specifically, the housing 12 is preferably manufactured from a ¼ inch thick aluminum honeycomb sheet material. While preferred materials are disclosed in accordance with a preferred embodiment of the present invention, it is contemplated other materials may be used without departing from the spirit of the present invention. Regardless of the material used in the construction of the housing 12, the chosen material should resonate in a manner transmitting sound from the interior of the housing 12. The mechanism by which the housing 12 functions as a transducer in the transmission of sound is discussed below in greater detail.

The housing 12 is composed of eight lateral side walls, that is, two long lateral side walls 14a, 14b, two short lateral side walls 14c, 14d, and four short corner side walls 16a-d. The housing 12 also includes a cover plate 36 positioned over the top surface of the side walls 14a-d, 16a-d. The four short corner side walls 16a-d are positioned between, and connected to, respective long lateral side walls 14a, 14b and short lateral side walls 14c, 14d. The corner side walls 16a-d are oriented at a 45 degree angle relative to the respective long lateral side walls 14a, 14b and short lateral side walls 14c, 14d. As such, and when viewed from above or below (see FIG. 4), the housing 12 has an eight-sided geometric configuration, with a generally rectangular configuration as a result of the long lateral side walls 14a, 14b and the short lateral side walls 14c, 14d. The specific configuration of the housing 12 is critical to proper placement of the housing 12 within limited and predefined spaces within the aircraft that are available for the mounting of the subwoofer module 10.

As will be discussed below in greater detail, each of the four short corner side walls 16a-d includes a first aperture 18 and a second aperture 20. The functions of the respective first aperture 18 and the second aperture 20 are distinct to their positioning along the corner side walls 16a-d and the first aperture 18 is, therefore, positioned above the second aperture 20. That is, and considering the preferred positioning of the subwoofer module 10 on the floor of an aircraft, the first aperture 18 is located closer to the cover plate 36 than the second aperture 20. In addition, one of the corner side walls 16d is provided with a third aperture 22 for the passage of wires into the housing 12 for attachment to the low frequency driver 24 in a manner allowing for connection to the sound source (not shown).

A central driver mounting plate 28 is secured to the respective lateral side walls 14a-d and the corner side walls 16a-d of the housing 12 and divides the housing 12 into an upper compartment 30 and a lower compartment 32. The central driver mounting plate 28, therefore, lies in a plane that is substantially parallel to the plane in which the cover plate 36 lies. Specifically, the upper compartment 30 is defined by the upper surface 34 of the driver mounting plate 28, the respective lateral side walls 14a-d and the corner side walls 16a-d of the housing 12, and a cover plate 36. The first apertures 18 link (that is, permit fluid communication therebetween) the upper compartment 30 to the external environment surrounding the housing 12.

The lower compartment 32 is defined by the lower surface 38 of the driver mounting plate 28 and the respective lateral side walls 14a-d and the corner side walls 16a-d of the housing 12, while the bottom 40 of the housing 12 remains open to be ultimately closed off when the subwoofer module 10 is mounted to the floor 42 in the manner discussed below in greater detail. The second apertures 20 link the lower compartment 32 to the external environment surrounding the housing 12 when the bottom 40 of the housing 12 is closed off upon mounting to the floor 42 as shown in FIGS. 5 and 6.

A low frequency driver 24 is mounted to the driver mounting plate 28 in alignment with the aperture 29 formed in the driver mounting plate 28. The driver 24 is positioned to fire into the lower compartment 32 of the housing 12 with the convex portion 44 (and magnet 45) of the driver 24 extending into the upper compartment 30 of the housing 12. With this in mind, the first apertures 18 allow for the flow of air into and out of the upper compartment 30 for cooling the driver 24. Protection of the driver 24, without adversely affecting the flow of air into and out of the upper compartment 30, is achieved by securing a permeable filtering material 46 over the first apertures 18. In accordance with a preferred embodiment, the permeable filtering material 46 is NOMEX, a flame resistant meta-aramid material, although it is contemplated other filtering materials may be used without departing from the spirit of the present invention.

In use, and with reference to FIGS. 5 and 6, the present subwoofer module 10 is designed for mounting to the floor 42 beneath an aircraft seat 48. Mounting is achieved by the provision of mounting brackets 50 secured to each of the corner side walls 16a-d. Each of the mounting brackets 50 is identical and only one will be described herein.

Figure 3:
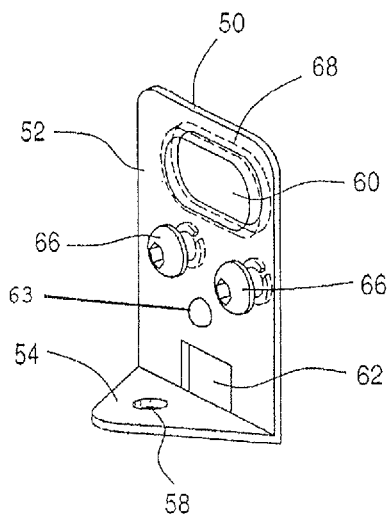
FIG. 3 is a detailed view of a mounting bracket in accordance with the present invention.
Figure 4:
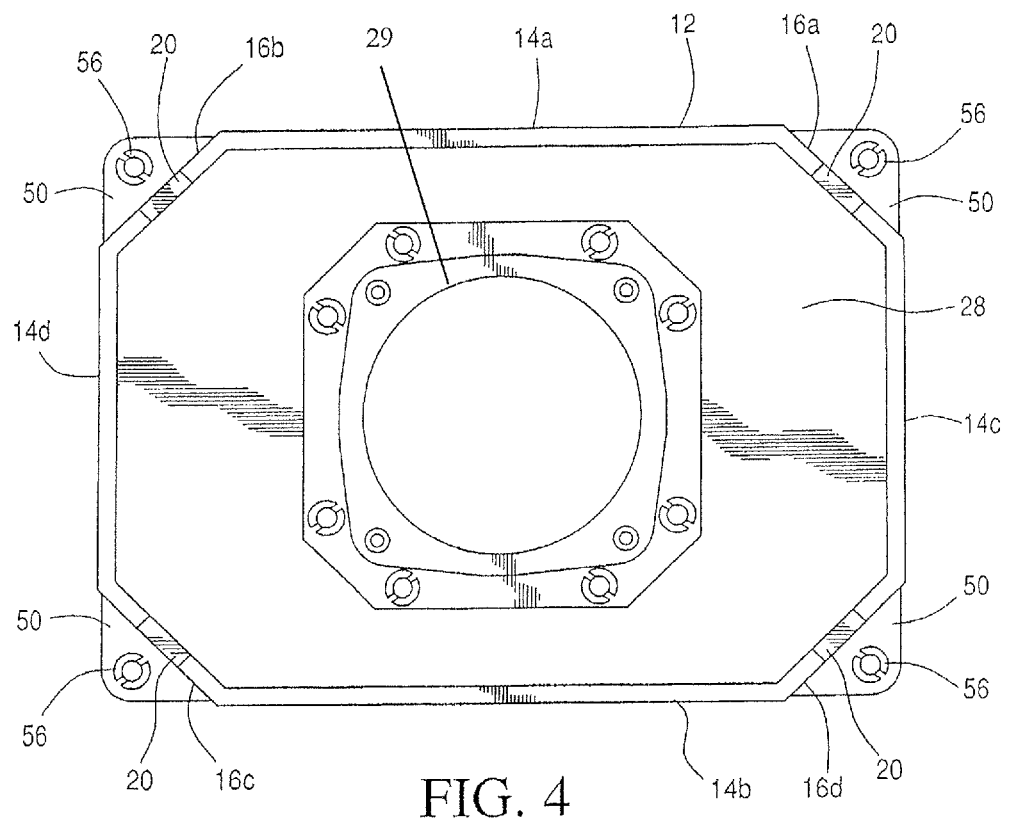
FIG. 4 is a bottom plan view of the present subwoofer module.

Referring to FIG. 3, the mounting bracket 50 is substantially L-shaped and includes a first leg 52 and a second leg 54 oriented at a 90 degree angle relative to each other. The first leg 52 is shaped and dimensioned for direct attachment to the corner side wall 16a-d via screws 66 and the second leg 54 is shaped and dimensioned for attachment to the floor 42, or other support surface, via SHURLOCK fasteners 56 which extend through holes 58 formed in the second leg 54. As discussed above, each of the corner side walls 16a-d includes a first aperture 18 and a second aperture 20. The first leg 52 is, therefore, constructed with first and second mounting bracket apertures 60, 62 shaped and dimensioned for alignment with the first and second apertures 18, 20 formed in the corner side walls 16a-d. Alignment of the first and second mounting bracket apertures 60, 62 relative to the first and second apertures 18, 20 is achieved by providing the first mounting bracket aperture with a rearwardly facing lip 68 shaped and dimensioned for positioning within the first aperture 18 along the corner side walls 16a-d. In this way, the mounting bracket 50 must be properly aligned along the respective corner side walls 16a-d for the rearwardly facing lip 68 to seat within the first aperture 18. The first leg 52 is also provided with a central third mounting bracket aperture 63 shaped and dimensioned for alignment with the third aperture 22 formed in only one of the corner side walls 16d.

In addition, and as discussed above, one of the corner side walls, for example, corner side wall 16d, is provided with a third aperture 22 for the passage of wires into the housing 12 for attachment to the driver 24 in a manner allowing for connection to the sound source. The mounting bracket 50 is, therefore, also provided with a third mounting bracket aperture 63 shaped and dimensioned for alignment with the third aperture 22 when positioned along the corner side wall 16d including the third aperture 22. When the mounting bracket 50 is secured to a corner side wall without a third aperture, the third mounting bracket aperture 63 will simply be covered by the corner side wall.

Still further, and for reasons that will be discussed below in greater detail, the second leg 54 is triangular in shape. In fact, the triangular shape substantially matches the shape of a triangle that would be created by the corner side wall 16a-d and extensions of the short lateral side wall 14c, 14d and the long lateral side wall 14a, 14b if one were to extend the adjacent short lateral side walls 14c, 14d and the long lateral side walls 14a, 14b to a point at which they intersect.

In practice, and with the first leg 52 secured to the corner side wall 16a-d such that the second leg 54 is aligned with the bottom edge 61 of the respective lateral side walls 14a-d and corner side walls 16a-d, fasteners 56 bolt the subwoofer module 10 to the floor 42 beneath an aircraft seat 48 with the lower compartment 32 facing downwardly and the bottom edge 61 of the housing 12 contacting the floor 42 of the aircraft to substantially seal the lower compartment 32. In this way, the lower compartment 32 of the housing 12 becomes a sealed enclosure.

By providing the corner side walls 16a-d in combination with the mounting brackets 50 discussed above, the entirety of the subwoofer module 10 defines a rectangular space in which it may be mounted. Without the specific configuration disclosed herein, it would be necessary to provide some sort of mounting structure extending beyond the rectangular window in which the subwoofer module is designed for mounting.

Figure 7:
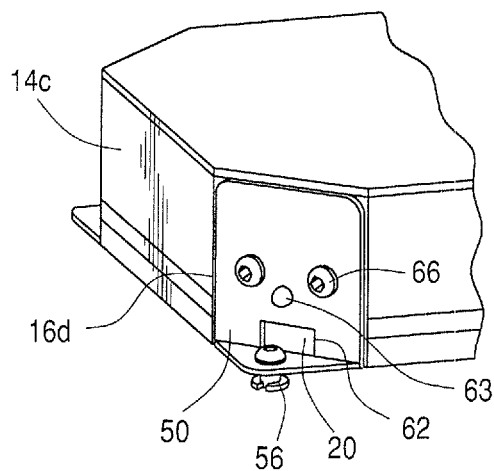
FIGS. 7, 8 and 9 are respectively a partial top perspective view, a detailed view of a mounting bracket and a partial internal cross sectional view in accordance with an alternate embodiment of the present invention.
Figure 8:
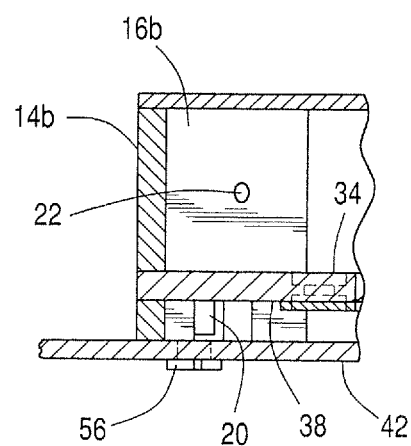
Figure 9:
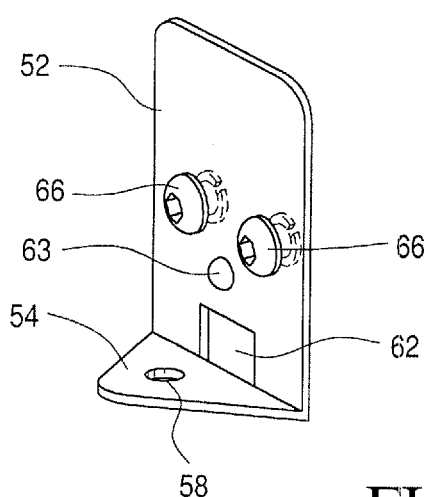
Figure 12:
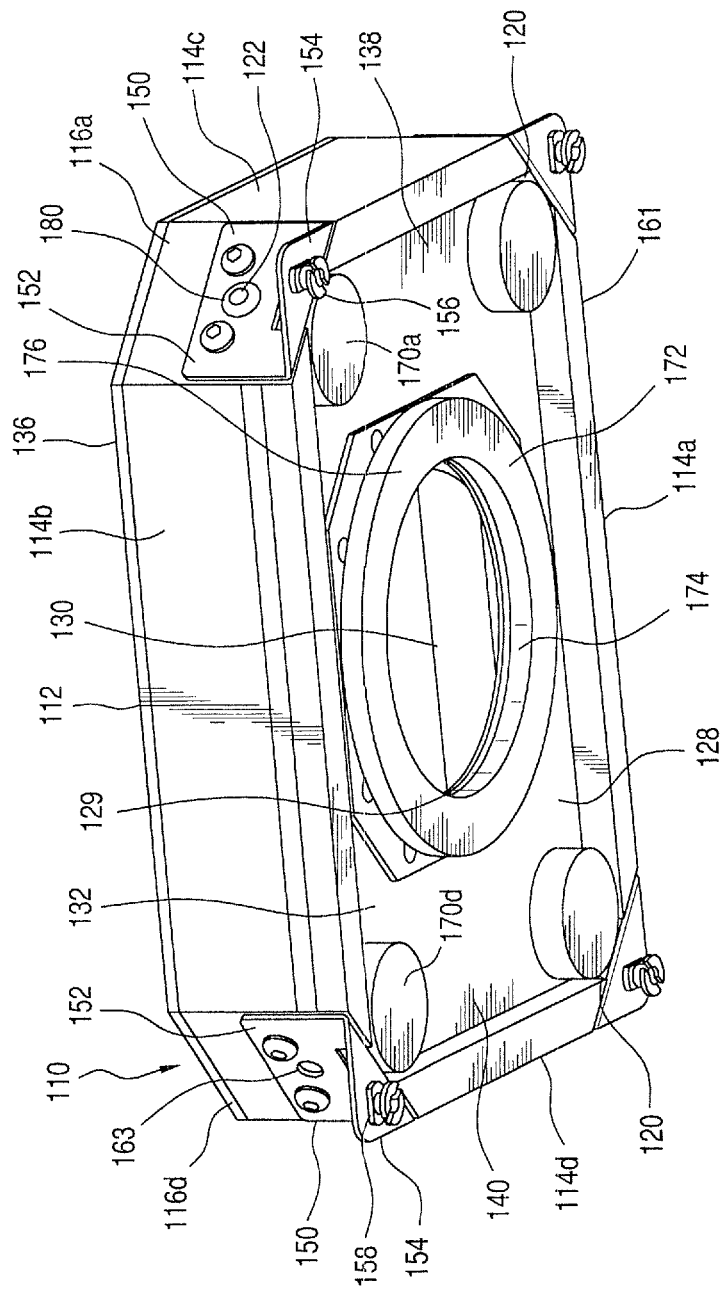
FIG. 12 is a bottom perspective view of a subwoofer module (with the driver removed) in accordance with an alternate embodiment.
Figure 15:
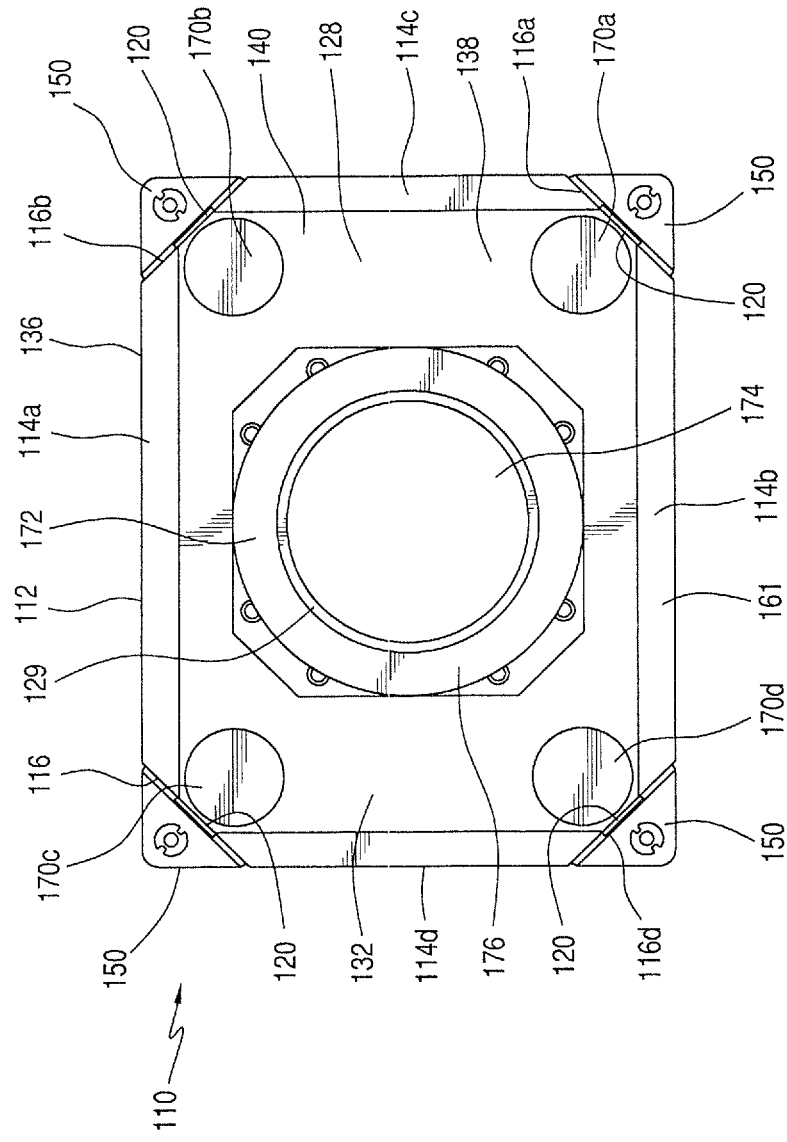
FIG. 15 is a bottom plan view of the subwoofer module shown in FIG. 12.
Figure 16:
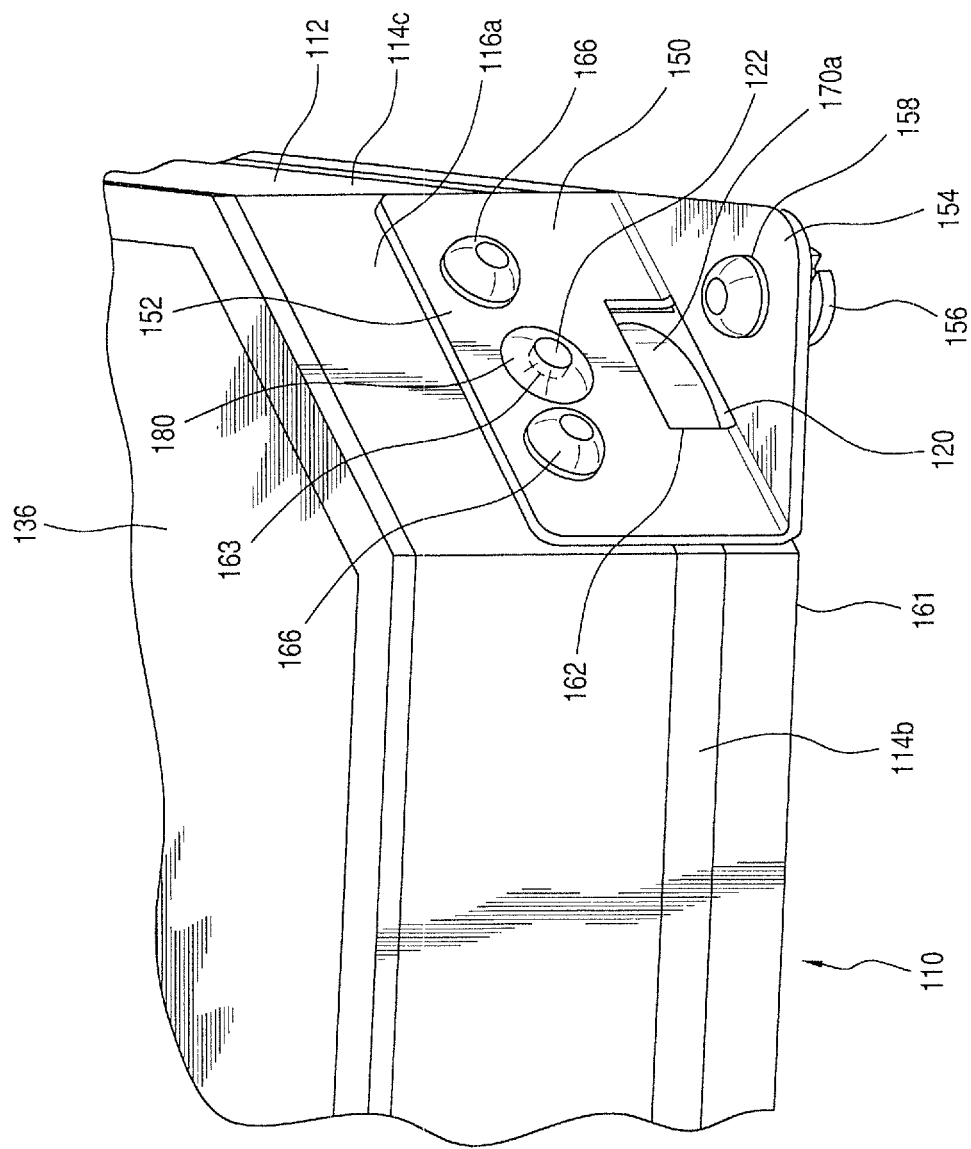
FIG. 16 is a detailed view of the mounting brackets employed in accordance with the embodiment of FIG. 12.

In accordance with an alternate embodiment as shown with reference to FIGS. 7, 8 and 9 (where similar reference numerals are used for those elements corresponding to the embodiment shown with reference to FIGS. 1 to 6), each of the four short corner side walls 16a-d only includes a second aperture 20. The first apertures 18 shown with reference to FIGS. 1 to 6 are not included with this embodiment. Accordingly, the mounting brackets 50 in accordance with this embodiment are similarly constructed without the first mounting bracket aperture 60 or the rearwardly facing lip 68 as disclosed with reference to the embodiment shown in FIGS. 1 to 6.

With this in embodiment in mind, and with reference to FIGS. 10 and 11, the mounting brackets 50 may be constructed such that they do not fully cover the entirety of the corner side walls 16a-d, since the corner side walls 16a-d above the mounting bracket 50 are solid, that is, they include no apertures.

As briefly discussed above, the sealed enclosure of the lower compartment 32 is exposed to the external environment via the second apertures 20 formed in each of the corner side walls 16a-d as discussed above. Additional sound is transmitted from the housing 12 which resonates in conjunction with the driver 24.

Mounting the present subwoofer module 10 in this manner presents further advantages improving the sound generated by the properly mounted subwoofer module 10. For example, the creation of a partially enclosed-lower compartment 32, including the respective second apertures 20 formed in the corner side walls 16a-d, reduces possible excursions ($X_{max}$) of the driver 24 by physically damping the movement of the driver cone 64 with progressively greater pressure on the driver cone 64. That is, because the driver cone 64 moves within the confined space defined by the lower compartment 32, pressure is generated as the driver cone 64 moves closer to the surface of the floor 42 upon which the subwoofer module 10 is mounted. The pressure increases in such a way that the generated pressure prevents further movement of the driver cone 64.

The reduction and control of the possible excursion of the driver cone 64 eliminate cone chirp which results when the driver cone 64 moves beyond $X_{max}$. With this in mind, the second apertures 20 and the relative position of the driver 24 with respect to the floor 42 may be tuned to enhance the efficiency of the present subwoofer design.

In addition, the controlled excursion of the driver cone 64 enhances the sound resonating from the housing 12 itself to produce a full low frequency sound from an enclosure substantially smaller and lighter than woofers found in the prior art.

With reference to FIGS. 12 to 16, and in accordance with an alternate embodiment, a loudspeaker assembly in the form of a subwoofer module 110 is disclosed. The present subwoofer module 110 is particularly designed for horizontal positioning on the floor of an aircraft.

The subwoofer module 110 includes a substantially rectangular housing 112. The housing 112 is preferably manufactured from aluminum. More specifically, the housing 112 is preferably manufactured from a ¼ inch thick aluminum honeycomb sheet material. Regardless of the material used in the construction of the housing 112, the chosen material should resonate in a manner transmitting sound from the interior of the housing 112.

The housing 112 is composed of eight lateral side walls, that is, two long lateral side walls 114a, 114b, two short lateral side walls 114c, 114d and four short corner side walls 116a-d. The housing 112 also includes a cover plate 136 positioned over the top surface of the lateral and corner side walls 114a-d, 116a-d. The four short corner side walls 116a-d are positioned between, and connected to, respective long lateral side walls 114a, 114b and short lateral side walls 114c, 114d. The corner side walls 116a-d are oriented at a 45 degree angle relative to the respective long lateral side walls 114a, 114b and short lateral side walls 114c, 114d. As such, and when viewed from above and below (see FIGS. 12 and 15), the housing 112 has an eight-sided geometric configuration, with a generally rectangular configuration as a result of the long lateral side walls 114a, 114b and the short lateral side walls 114c, 114d. The specific configuration of the housing 112 is critical to proper placement of the housing 112 within limited and predefined spaces within the aircraft that are available for the mounting of the subwoofer module 110.

As will be discussed below in greater detail, and as with the embodiment discussed above with reference to FIGS. 7 to 11, each of the four short corner side walls 116a-d only includes a second aperture 120. In addition, one of the corner side walls 116d is provided with a third aperture 122 for the passage of wires into the housing 112 for attachment to the low frequency driver 124 in a manner allowing for connection to the sound source (not shown).

A central driver mounting plate 128 is secured to the respective lateral side walls 114a-d and the corner side walls 116a-d of the housing 112 and divides the housing 112 into an upper compartment 130 and a lower compartment 132. The central driver mounting plate 128, therefore, lies in a plane that is substantially parallel to the plane in which the cover plate 136 lies. Specifically, the upper compartment 130 is defined by the upper surface 134 of the driver mounting plate 128, the respective lateral side walls 114a-d and the corner side walls 116a-d of the housing 112, and the cover plate 136.

The lower compartment 132 is defined by the lower surface 138 of the driver mounting plate 128 and the respective lateral side walls 114a-d and the corner side walls 116a-d of the housing 112, while the bottom 140 of the housing 112 remains open to be ultimately closed off when the subwoofer module 110 is mounted to the floor in the manner discussed above in greater detail. The second apertures 120 link the lower compartment 132 to the external environment surrounding the housing 112 when the subwoofer module 110 is mounted to the floor and the bottom 140 is closed off.

A low frequency driver 124 is mounted to the driver mounting plate 128 in alignment with the aperture 129 formed in the driver mounting plate 128. The driver 124 is positioned to fire into the lower compartment 132 of the housing 112 with the convex portion 144 of the driver 124 extending into the upper compartment 130 of the housing 112.

Foam acoustic members 170a-d are secured to the lower surface 138 of the driver mounting plate 128 at strategic locations enhancing the sound reproduction characteristics of the subwoofer module 110. The foam is lightweight and adds no significant weight to the subwoofer module 110. In accordance with a preferred embodiment, the foam is ENSOLITE, closed cell foam.

In particular, a single foam acoustic member 170a-d is positioned adjacent each of the second apertures 120 at the junction of adjacent lateral side walls 114a-d and a corner side wall 116a-d. Accordingly, the subwoofer module 110 includes four foam acoustic members 170a-d symmetrically positioned at each of the corners of the lower compartment 132. For example, and with reference to the laterals side walls 1141) and 114c, and corner side wall 116a, a single cylindrical foam acoustic member 170a is secured to the lower surface 138 of the driver mounting plate 128 so as to extend downwardly and into the lower compartment 132 of the housing 112. The foam acoustic member 170a is positioned so that it is slightly spaced from each of the lateral side walls 114a, 114c and the corner side wall 116a.

The length of each of the foam acoustic members 170a-d is such that it extends the same length as the distance from the lower surface 138 of the driver mounting plate 128 to the bottom edge 161 of the respective lateral side walls 114a-d and corner side walls 116a-d. As such, and when the subwoofer module 110 is mounted to a supporting surface as described below, the foam acoustic members 170a-d will extend fully between the lower surface 138 of the driver mounting plate 128 and the supporting surface to which the subwoofer module 110 is secured. In this way, airflow out of the lower compartment 132 via the second apertures 120 and around the foam acoustic members 170a-d is controlled by the spacing between the foam acoustic members 170a-d and lateral side walls 114a-d, the corner side wall 116a-d and the second apertures 120.

The exact spacing is chosen so as to optimize the transmission of sound while dampening undesired frequency that might be generated by the driver 124. This is achieved by restricting airflow within the housing 112 without propagating noise.

In addition to the foam acoustic members 170a-d positioned at each corner of the lower compartment 132, the lower compartment 132 is provide with an annular acoustic member 172 positioned about the driver 124. In particular, the annular acoustic member 172 is constructed from the same foam as the foam acoustic members 170a-d and extends downwardly from the lower surface 138 of the driver mounting plate 128 around the circumference of the driver 124 mounted within the driver mounting plate 128. This creates a cylindrical cavity 174 into which the driver 124 emits sound. In contrast to the foam acoustic members 170a-d at the corners of the lower compartment 132, the annular acoustic member 172 is slight shorter than the distance from the distance from the lower surface 138 of the driver mounting plate 128 to the bottom edge 161 of the respective lateral side walls 114a-d and corner side walls 116a-d. As such, and when the subwoofer module 110 is mounted to a supporting surface as described below, the annular acoustic member 172 does not extend fully between the lower surface 138 of the driver mounting plate 128 and the bottom edge 161, leaving a small space between the lower edge 176 of the annular acoustic member 172 and the supporting surface to which the subwoofer module 110 is secured. In this way, airflow out of the cavity 174 defined by the annular acoustic member 172 is controlled and limited to the spacing between the lower edge 176 of the annular acoustic member 172 and the supporting surface. This spacing allows for controlled dampening of undesired frequencies without creating additional noise by reshaping the housing 112 or the second apertures 120.

In use, and as discussed above with reference to FIGS. 5 and 6, the present subwoofer module 110 is designed for mounting to the floor beneath an aircraft seat. Mounting is achieved by the provision of mounting brackets 150 secured to each of the corner side walls 116a-d. Each of the mounting brackets 150 is identical and only one will be described herein.

The mounting bracket 150 is substantially L-shaped and includes a first leg 152 and a second leg 154 oriented at a 90 degree angle relative to each other. The first leg 152 is shaped and dimensioned for direct attachment to the corner side wall 116a-d via screws 166 and the second leg 154 is shaped and dimensioned for attachment to the floor 142, or other support surface, via SHURLOCK fasteners 156 which extend through holes 158 formed in the second leg 154. As with the embodiment discussed above with reference to FIGS. 7, 8 and 9, each of the corner side walls 116a-d includes a second aperture 120. The first leg 152 is, therefore, constructed with second mounting bracket apertures 162 shaped and dimensioned for alignment with the second apertures 120 formed in the corner side walls 116a-d. The first leg 152 is also provided with a central third mounting bracket aperture 163 shaped and dimensioned for alignment with the third aperture 122 (wherein a grommet 180 extends through the third mounting bracket aperture 163 and the third aperture 122) formed in only one of the corner side walls 116d.

In addition, and as discussed above, one of the cornet side walls 116d is provided with a third aperture 122 for the passage of wires into the housing 112 for attachment to the driver 124 in a manner allowing for connection to the sound source. The mounting bracket 150 is, therefore, also provided with a third mounting bracket aperture 163 shaped and dimensioned for alignment with the third aperture 122 when positioned along the corner side wall 16d including the third aperture 22. When the mounting bracket 150 is secured to a wall without a third aperture, the third mounting bracket aperture 163 will simply be covered by the side wall.

Still further, and for reasons that will be discussed below in greater detail, the second leg 154 is triangular in shape. In fact, the triangular shape substantially matches the shape of a triangle that would be created by the corner side wall 116a-d and extensions of the short lateral side wall 114c, 114d and the long lateral side wall 114a, 114b if one were to extend the adjacent short lateral side walls 114c, 114d and the long lateral side walls 114a, 114b to a point at which they intersect.

In practice, and with the first leg 152 secured to the corner side wall 116a-d such that the second leg 154 is aligned with the bottom edge 161 of the respective lateral side walls 114a-d and corner side walls 116a-d, fasteners 156 bolt the subwoofer module 110 to the floor beneath an aircraft seat with the lower compartment 132 facing downwardly and the bottom edge 161 of the housing 112 contacting the floor of the aircraft to substantially seal the lower compartment 132. In this way, the lower compartment 132 of the housing 112 becomes a sealed enclosure.

By providing the corner side walls in combination with the mounting brackets discussed above, the entirety of the subwoofer module defines a rectangular space in which it may be mounted. Without the specific configuration disclosed herein, it would be necessary to provide some sort of mounting structure extending beyond the rectangular window in which the subwoofer module is designed for mounting.

By using the floor of the aircraft to form a wall of the lower compartment of the housing, substantial weight savings are realized. In accordance with the preferred embodiment of the present invention, use of the floor in completing the lower compartment results in a substantial weight savings. While a simple plate in a housing may appear to represent only a small amount of weight, any weight reduction within an aircraft is considered to be a substantial benefit, especially as more than one unit per aircraft is necessary.

The resulting subwoofer module is wired in a conventional manner, which those skilled in the art will readily appreciate. As such, variations in wiring are contemplated in accordance with the spirit of the present invention.

It should be appreciated that the concepts surrounding the present invention may be applied in various applications without departing from the spirit of the present invention. As such, the dimensions of the subwoofer module may be varied to suit specific applications in accordance with the spirit of the present invention.

In practice, multiple subwoofers are commonly mounted within an aircraft. The number of subwoofers employed is determined by the size of the aircraft and the needs of the aircraft owners. Those of ordinary skill in the art will certainly appreciate the need for specific positioning of the subwoofers within the aircraft to optimize the generated sound.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A loudspeaker module, comprising:
a housing including a plurality of side walls and a cover plate positioned over a top surface of the plurality of side walls, a bottom of the housing remaining open;
a driver mounting plate is secured to the plurality of side walls and divides the housing into an upper compartment and a lower compartment, wherein the upper compartment is defined by an upper surface of the driver mounting plate, the plurality of side walls and the cover plate, and the lower compartment is defined by a lower surface of the driver mounting plate and the plurality of side walls, the bottom of the housing remaining open to be ultimately closed off when the loudspeaker module is mounted to a supporting surface;
at least one of the plurality of side walls including an aperture linking the lower compartment to an external environment surrounding the housing;
a driver mounted to the driver mounting plate, the driver being positioned to fire into the lower compartment of the housing;
a mounting bracket secured to the at least one of the plurality of side walls including the aperture, the mounting bracket including a mounting bracket aperture shaped and dimensioned for alignment with the aperture within the at least one of the plurality of side walls.

2. The loudspeaker module according to claim 1, wherein the driver is a low frequency driver.

3. The loudspeaker module according to claim 1, wherein the housing is made of aluminum honeycomb sheet material that resonates in a manner transmitting sound from an interior of the housing.

4. The loudspeaker module according to claim 1, wherein the housing includes four lateral side walls and four corner side walls, the four corner side walls are positioned between, and connected to, respective lateral side walls.

5. The loudspeaker module according to claim 4, wherein the four corner side walls are oriented at a 45 degree angle relative to the respective lateral side walls.

6. The loudspeaker module according to claim 4, wherein the four lateral side walls include two long lateral side walls and two short lateral side walls, and the four corner side walls are positioned between, and connected to, a respective long lateral side wall and a short lateral side wall.

7. The loudspeaker module according to claim 6, wherein each of the four corner side walls includes a first aperture and a second aperture, wherein the first aperture is positioned above the second aperture.

8. The loudspeaker module according to claim 7, further including a plurality of identical mounting brackets shaped and dimensioned for selective attachment to each of the four corner side walls, each of the mounting brackets includes a first leg and a second leg; the first leg being shaped and dimensioned for direct attachment to a corner side wall and the second leg is shaped and dimensioned for attachment to a support surface, the first leg being constructed with a first mounting bracket aperture and a second mounting bracket aperture shaped and dimensioned for respective alignment with the first aperture and the second aperture.

9. The loudspeaker module according to claim 7, wherein a convex portion of the driver extends into the upper compartment of the housing, such that the first apertures allow for the flow of air into and out of the upper compartment for cooling the driver.

10. The loudspeaker module according to claim 7, wherein a permeable filtering material is secured over the first apertures.

11. The loudspeaker module according to claim 6, wherein the four corner side walls are oriented at a 45 degree angle relative to the respective lateral side walls.

12. The loudspeaker according to claim 1, further including an acoustic member positioned within the lower compartment adjacent the aperture in the at least one of the plurality of side walls.

13. The loudspeaker according to claim 12, wherein the acoustic member is foam.

14. A loudspeaker module, comprising:
a housing including a plurality of side walls and a cover plate positioned over a top surface of the plurality of side walls, a bottom of the housing remaining open;
a driver mounting plate is secured to the plurality of side walls and divides the housing into an upper compartment and a lower compartment, wherein the upper compartment is defined by an upper surface of the driver mounting plate, the plurality of side walls and the cover plate, and the lower compartment is defined by a lower surface of the driver mounting plate and the plurality of side walls, the bottom of the housing remaining open to be ultimately closed off when the loudspeaker module is mounted to a supporting surface;
at least one of the plurality of side walls including an aperture linking the lower compartment to an external environment surrounding the housing;
a driver mounted to the driver mounting plate in alignment with an aperture formed in the driver mounting plate, the driver being positioned to fire into the lower compartment of the housing with a convex portion of the driver extending into the upper compartment of the housing;
a mounting bracket secured to the at least one of the plurality of side walls including the aperture, the mounting bracket including a mounting bracket aperture shaped and dimensioned for alignment with the aperture within the at least one of the plurality of side walls.

15. The loudspeaker module according to claim 14, wherein at least one of the plurality of sidewalls includes a first aperture and a second aperture, which is the aperture linking the lower compartment to the external environment, wherein the first aperture is positioned above the second aperture.

16. The loudspeaker module according to claim 15, wherein the convex portion of the driver extends into the upper compartment of the housing such that the first aperture allows for the flow of air into and out of the upper compartment for cooling the driver.

17. The loudspeaker module according to claim 15, wherein a permeable filtering material is secured over the first aperture.

\* \* \* \* \*